S. KÉRI.
VEHICLE SIGNAL-DEVICE.
APPLICATION FILED OCT. 28, 1921.

1,432,342.

Patented Oct. 17, 1922.
2 SHEETS—SHEET 1.

Inventor
Stefan Kéri

By *(signature)*
Attorney

S. KÉRI.
VEHICLE SIGNAL DEVICE.
APPLICATION FILED OCT. 28, 1921.
1,432,342.
Patented Oct. 17, 1922.
2 SHEETS—SHEET 2.
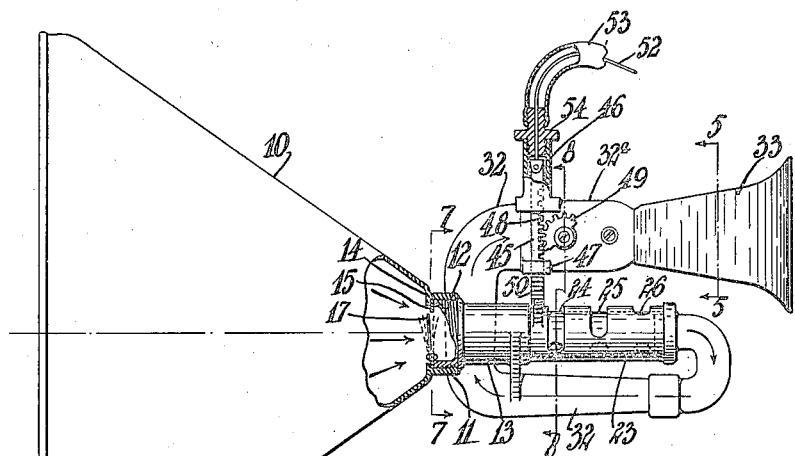
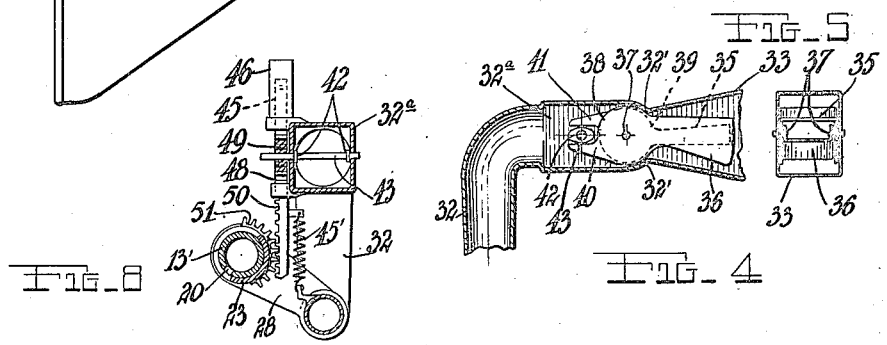
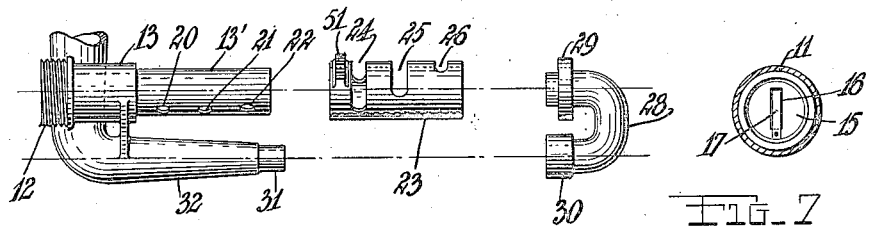
Inventor
Stefán Kéri Patented Oct. 17, 1922.

1,432,342

UNITED STATES PATENT OFFICE.

STEFÁN KÉRI, OF MANVILLE, NEW JERSEY.

VEHICLE SIGNAL DEVICE.

Application filed October 28, 1921. Serial No. 511,072.

*To all whom it may concern:*

Be it known that I, STEFÁN KÉRI, a citizen of Hungary, residing at Manville, in the county of Somerset and State of New Jersey, have invented certain new and useful Improvements in Vehicle Signal Devices, of which the following is a specification.

This invention relates to horns for automobiles, bicycles or other vehicles and it has for a general object to provide a novel and improved horn of this type.

More specifically speaking, the invention has for an object to provide a vehicle horn which is adapted to be operated by the air blast or current derived from the motion of the vehicle through the air.

For further comprehension of the invention, and of the objects and advantages thereof, reference will be had to the following description and accompanying drawings, and to the appended claims in which the various novel features of the invention are more particularly set forth.

Fig. 1 of the drawings is a side view of an automobile equipped with my improved horn.

Fig. 3 is a part side and part vertical sectional view of the horn.

Fig. 4 is a longitudinal vertical sectional view of the discharge end of the horn.

Fig. 5 is a transverse vertical section taken through the discharge end of the horn on the line 5—5 of Fig. 3.

Fig. 6 is a side view showing the sound control elements of the horn detached from one another.

Fig. 7 is a detail transverse section on the line 7—7 of Fig. 3.

Fig. 8 is a transverse section on the line 8—8 of Fig. 3.

Figure 1:
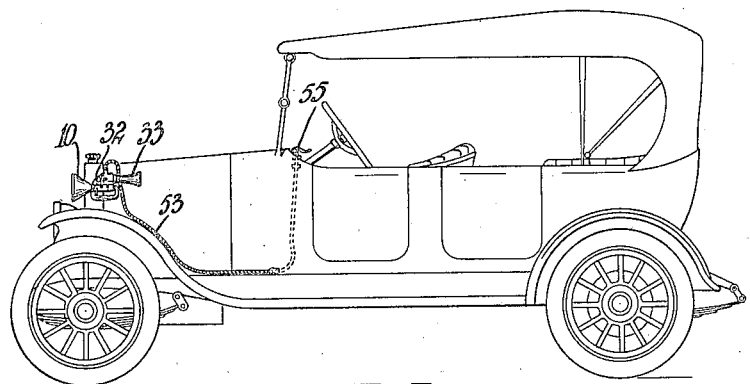

As here embodied my improved horn comprises a funnel-like intake member or mouth-piece 10 which is set to face toward the front of the automobile or bicycle, or other vehicle to which the horn may be applied. At its rear end this part 10 terminates in a neck 11 into which is screwed a nipple 12 formed on one end of one, 13, of the tubular sound control members. At the juncture of the neck 11 with the main body of intake member 10 an inturned annular flange 14 is formed and a disk 15 is pressed by the nipple 12 against this flange. This disk 15 has a diametrically extending slot 16 cut therein and this slot is substantially covered by a vibrator tongue 17 fixed at one end to the disk 15 adjacent one end of the slot 16.

The member 13 has a tubular rear extension 13' in which are formed a series of longitudinally alined openings 20, 21 and 22. Fitting freely over this extension is a sleeve 23 having a series of circumferential slots 24, 25 and 26 arranged in longitudinal correspondence to the respective openings 20, 21 and 22. These slots vary circumferentially in position on the sleeve 23 so as to allow of their being brought into registry in sequence with the openings by rotary movement of the sleeve.

The rear end of the tubular extension 13' has fitted thereinto an elbow 28 which has a flange 29 adapted to abut against the end of the extension, the opposite end of the elbow having an enlargement 30 fitting over a nipple 31 formed on the tubular discharge member 32 of the horn. This discharge member is preferably bent to U-shaped, with a rearwardly projecting flared bell 33 adjacent which is a control device adapted for operation by the means which shifts the sleeve 23. The bell 33 and the chamber 32ª containing the means for controlling the discharge of air being of square cross section.

This control device comprises a pair of channeled arms 35, 36 which are freely mounted on a pin 37 carried by the member 32 and which are arranged in opposed relation to one another, with the flanges of arm 36 adapted to engage between the flanges of arm 35. These arms have hollow hub elements 38, 39 which are of a size to completely fill the passage through the member 32, thus compelling the blast of air to pass between the arms 35, 36, the member 32 being constructed as at 32' to fit partially around the hubs 38, 39. The hubs 38, 39 have finger extension 40, 41 which are in opposed relation and are adapted to be engaged by cams 42 fixed to a rock-shaft 43 to move the arms toward one another, the air blast acting to move the arms in the opposite direction.

Figure 2:
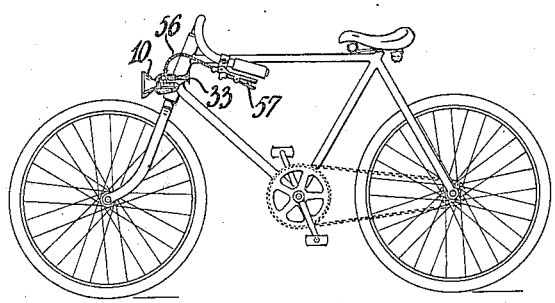
Fig. 2 is a side view of a bicycle having the horn applied thereto.

For operating the arms 35, 36 and sleeve I provide a vertical rack-bar 45 guided in upper and lower guide members 46 and 47 on the chambered portion 32', this bar having ing one set of gear teeth 48 meshing with a gear segment 49 fixed to the projecting end of shaft 43, and a second set of gear teeth 50 meshing with a gear segment 51 formed on the sleeve 23. A coiled tension spring 45' normally urges the rack-bar 45 downward, maintaining the sleeve 23 in position closing the openings 20, 21 and 22. The upper end of the rack-bar 45 has connected thereto a flexible wire 52 which leads to a suitably placed operating handle, the wire being enclosed by a tube 53 connected to a perforated plug 54 engaged in the upper guide member 46. In the embodiment of the invention as in Fig. 1 the horn is mounted beside the engine hood and the wire 52 is led backward, and then upward adjacent the dashboard and is provided with an operating handle 55. In the embodiment of the invention as shown in Fig. 2 the horn is mounted on the front of the frame of the bicycle and the wire is led through a shorter tube 56 to a handle 57 mounted on the handle bar of the bicycle.

As will be apparent, when the vehicle is in motion, a blast of air will be forced through the horn when the valve comprised by the arms 35, 36 is open, causing the horn to sound, while the volume and pitch of this sound can be controlled, by imparting a greater or less degree of movement to the operating handle and both carrying the space for the passage of air between the arms 35, 36 and uncovering different ones of the openings 20, 21, 22.

Having thus described my invention what I claim as new and desire to protect by Letters Patent of the United States is as follows:

1. A vehicle horn comprising a tube having a series of longitudinally spaced and alined openings, a sleeve rotatably mounted on said tube and having a series of circumferentially extending slots in longitudinal registry with said openings, said slots each having one end circumferentially offset from the corresponding ends of the other slots, and means for rotating said sleeve and a valve in said tube for controlling the passage of air therethrough.

2. A vehicle horn comprising a tube having a series of longitudinally spaced openings, a valve in said tube for controlling the passage of air therethrough, a sleeve rotatably mounted on said tube and controlling said openings, and a common mechanical operating means for said valve and sleeve.

3. A vehicle horn comprising a tube having a series of longitudinally spaced openings, a valve in said tube, a sleeve rotatably mounted on said tube and controlling said openings, and a common operating means for said valve and sleeve, said means including a pair of gear segments connected respectively to said valve and sleeve, and a rack-bar engaing said gear segments.

4. A vehicle horn comprising a tube having a series of longitudinally spaced openings, a valve in said tube, a sleeve rotatably mounted on said tube and controlling said openings, and a common operating means for said valve and sleeve, said means including a pair of gear segments connected respectively to said valve and sleeve, and a rack-bar engaging said gear segments, and a flexible wire connected to said rack-bar to move the same.

5. In a vehicle horn, a tube, a valve in said tube for controlling the passage of air therethrough and comprising a pair of channeled arms between which the air flows, said arms being pivoted to swing toward or away from one another to vary the size of the air passage and means for swinging said arms.

6. In a vehicle horn, a tube, a valve in said tube for controlling the passage of air therethrough and comprising a pair of channeled arms between which the air flows, said arms being pivoted to swing toward or away from one another to vary the size of the air passage, and means for swinging said arms in relatively opposite direction in unison.

7. In a vehicle horn, a tube, a valve in said tube for controlling the passage of air therethrough and comprising a pair of channeled arms between which the air flows, said arms being pivoted to swing toward or away from one another to vary the size of the air passage, and means for swinging said arms in relatively opposite direction in unison, said means comprising rigid fingers extending from said arms, and a rotary cam member adapted to engage said fingers and means for rotating said cam member.

8. In a vehicle horn, a funnel-like intake member, a tube connected therewith, a slotted disk extending across the passage through said member at its juncture with the tube, a resilient tongue covering said slot, a series of openings spaced longitudinally of said tube, a sleeve movably mounted on said tube for individually controlling said openings, means for rotating said sleeve, and a valve in said tube for controlling the passage of air therethrough.

In testimony whereof I have affixed my signature.

STEFÁN KÉRI.